United States Patent
Stabler et al.

(10) Patent No.: US 10,434,478 B2
(45) Date of Patent: *Oct. 8, 2019

(54) POROUS SEPARATION ARTICLE AND SEPARATION METHOD

(71) Applicant: Arkema Inc., King of Prussia, PA (US)

(72) Inventors: Sean M. Stabler, Pottstown, PA (US); Thomas F. Roland, Zionsville, PA (US); David A. Seiler, Garnet Valley, PA (US); Ramin Amin-Sanayei, Malvern, PA (US); Walter P. Kosar, Pottstown, PA (US)

(73) Assignee: Arkema Inc., King of Prussia, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/837,160

(22) Filed: Dec. 11, 2017

(65) Prior Publication Data

US 2018/0099250 A1 Apr. 12, 2018

Related U.S. Application Data

(63) Continuation-in-part of application No. 14/410,644, filed as application No. PCT/US2013/062801 on Oct. 1, 2013, now Pat. No. 9,839,881.

(60) Provisional application No. 61/709,536, filed on Oct. 4, 2012, provisional application No. 61/818,561, filed on May 2, 2013, provisional application No. 61/872,046, filed on Aug. 30, 2013.

(51) Int. Cl.

| | |
|---|---|
| *B01D 69/12* | (2006.01) |
| *C02F 1/44* | (2006.01) |
| *B01J 20/20* | (2006.01) |
| *C02F 1/28* | (2006.01) |
| *B01J 20/28* | (2006.01) |
| *B01D 67/00* | (2006.01) |
| *B01D 69/14* | (2006.01) |
| *B01D 71/02* | (2006.01) |
| *B01D 71/34* | (2006.01) |
| *C02F 1/00* | (2006.01) |

(52) U.S. Cl.
CPC ......... *B01D 69/12* (2013.01); *B01D 67/0079* (2013.01); *B01D 69/148* (2013.01); *B01J 20/20* (2013.01); *B01J 20/2803* (2013.01); *C02F 1/288* (2013.01); *C02F 1/44* (2013.01); *B01D 67/0004* (2013.01); *B01D 67/0041* (2013.01); *B01D 71/021* (2013.01); *B01D 71/34* (2013.01); *B01D 2323/06* (2013.01); *C02F 1/001* (2013.01); *C02F 1/283* (2013.01)

(58) Field of Classification Search
None
See application file for complete search history.

(56) References Cited

U.S. PATENT DOCUMENTS

| | | | |
|---|---|---|---|
| 9,839,881 B2 * | 12/2017 | Stabler | B01D 39/163 |
| 2014/0060727 A1 * | 3/2014 | Stouffer | B01J 20/20 |
| | | | 156/245 |

* cited by examiner

*Primary Examiner* — Chester T Barry
(74) *Attorney, Agent, or Firm* — Thomas F. Roland

(57) ABSTRACT

The invention relates to a porous separation article having a fluoropolymer, polyamide, PEEK, or PEKK binder interconnecting one or more types of interactive powdery materials or fibers. The interconnectivity is such that the binder connects the powdery materials or fibers in discrete spots rather than as a complete coating, allowing the materials or fibers to be in direct contact with, and interact with a fluid. The resulting article is a formed multicomponent, interconnected web, with porosity. The separation article is useful in water purification, as well as in the separation of dissolved or suspended materials in both aqueous and non-aqueous systems in industrial uses. The separation article can function at ambient temperature, as well as at elevated temperatures.

11 Claims, No Drawings

POROUS SEPARATION ARTICLE AND SEPARATION METHOD

This application is a Continuation-in-Part of U.S. application Ser. No. 14/410,644 filed Dec. 23, 2014, granted as U.S. Pat. No. 9,839,881 claiming benefit to PCT Application Number PCT/US2013/062801, filed Oct. 1, 2013; and U.S. Provisional Applications No. 61/709,536, filed Oct. 4, 2012; No. 61/818,561, filed May 2, 2013; and No. 61/872,046, filed Aug. 30, 2013, said applications incorporated herein by reference.

FIELD OF THE INVENTION

The invention relates to a porous separation article having a thermoplastic engineering polymer binder, such as a fluoropolymer, polyamide, polyether ketoneketone (PEKK) or polyether etherketone (PEEK), interconnecting one or more types of interactive powdery materials or fibers. The interconnectivity is such that the binder connects the powdery materials or fibers in discrete points as discrete particles rather than as a complete coating, allowing the materials or fibers to be in direct contact with, and interact with a fluid. The resulting article is a formed multicomponent, interconnected web, with porosity. The separation article is useful in water purification, as well as in the separation of dissolved or suspended materials in both aqueous, non-aqueous and gaseous systems in industrial uses. The separation article can function at ambient temperature, as well as at elevated temperatures.

BACKGROUND OF THE INVENTION

Fluoropolymer filtration membranes are well known, as described in US patents such as U.S. Pat. Nos. 6,013,688 and 6,110,309. Fluoropolymers, such as polyvinylidene fluoride (PVDF) are very chemically and biologically inert and have outstanding mechanical properties. They are resistant to oxidizing environments, such as chlorine and ozone, which are widely used in the sterilization of water. PVDF membranes are also highly resistant to attack by most mineral and organic acids, aliphatic and aromatic hydrocarbons, alcohols, and halogenated solvents. Fluoropolymers in general, and especially PVDF, is resistant to sterilization by, for example, steam, chemicals, UV radiation, irradiation, and ozone.

U.S. Pat. No. 3,864,124 describe the use of polytetrafluorethylene (PTFE) to immobilize a non-fiberizing material.

U.S. Pat. Nos. 5,019,311; 5,147,722 and U.S. Pat. No. 5,331,037 describe an extrusion process to produce a porous structure containing interactive particles bound together by a polymer binder. The porous structure is described as a "continuous web matrix", or "forced point bonds". The solid composite article is useful as a high performance water filter, such as in a carbon block filter. Thermoplastic binders listed for use in the process include polyvinyl fluoride as the only fluoropolymer, with examples of polyethylene and polyamide 11. Polyvinyl fluoride is difficult to process, as it is not thermoplastic.

US 2010-0304270 describes the use of an aqueous composition containing a high molecular weight aqueous fluoropolymer binder and a powdery material (such as carbon) to produce a porous solid material in which the particles are bound together only at specific discrete points to produce interconnectivity. The particles are bound together in a continuous web, while leaving the majority of each particle exposed to fluids passing over them. The binder level used is 0.5 to 25%, preferably 0.5-15% and most preferably from 1-10%.

It has now surprisingly been found that high molecular weight fluoropolyrner and polyamide binders can be used to bind interactive particles and/or fibers together in such a manner as to create interconnectivity of the particles and/or fibers. The bound particles or fibers can be formed into articles for the separation of materials dissolved or suspended in fluids. The porous solid separation articles are especially useful for the removal of contaminants from potable water; the separation of contaminants from liquid or gaseous industrial streams; the capture and recovery of small molecules from fluid streams, such as biological and pharmaceutically active moieties, and precious metals, and the performance of specific chemical reactions, such as through catalysis. Depending on the type of activity of the interactive particles, the particles may separate the dissolved or suspended materials by chemical reaction, physical entrapment, electrical (charge or ionic) attraction, or similar means.

SUMMARY OF THE INVENTION

The invention relates to a composite solid article for the separation of components of a fluid composition comprising:

a) 0.2 to 150 parts of a high molecular weight fluoropolymer or polyamide binder, and b) 10 to 500 parts of interactive particles having an average particle diameter of from 0.1 to 3,000 microns, wherein said interactive particles exhibit interconnectivity.

DETAILED DESCRIPTION OF THE INVENTION

As used herein copolymer refers to any polymer having two or more different monomer units, and would include terpolymers and those having more than three different monomer units.

The references cited in this application are incorporated herein by reference.

"Interconnectivity", as used herein means that the interactive particles or fibers are permanently bonded together by the fluoropolymer or polyamide binder without completely coating the interactive particles or fibers. The binder adheres the interactive particles together at specific discrete points to produce an organized, porous structure. The porous structure allows a fluid to pass through the interconnected particles or fibers, and the fluid composition is exposed directly to the surface(s) of the interactive particles or fibers, favoring the interaction of the particles with components of the fluid composition, resulting in separation of the components. Since the polymer binder adheres to the interactive particles in only discrete points, less binder is used for full connectivity then in a coating.

Percentages, as used herein are weight percentages, unless noted otherwise, and molecular weights are weight average molecular weights, unless other wise stated.

Polyamides

The term polyamide refers to the condensation products:

of one or more amino acids, such as aminocaproic, 7-aminoheptanoic, 11-aminoundecanoic and 12-aminododecanoic acid, or of one or more lactams such as caprolactam, oenantholactam and lauryllactam;

of one or more salts or mixtures of diamines such as hexamethylenediamine, dodecamethylenediamine, meta-xylylenediamine, bis(p-aminocyclohexyl)methane and trimethylhexamethylenediamine with diacids such as isophthalic, terephthalic, adipic, azelaic, suberic, sebacic and dodecanedicarboxylic acid.

Examples of polyamides that may be mentioned include PA 6, PA 7, PA 8, PA9, PA 10, PA11, and PA 12 and copolyamides like PA 6,6.

It is also possible to make advantageous use of copolyamides. Mention may be made of the copolyamides resulting from the condensation of at least two alpha,omega-amino carboxylic acids or of two lactams or of one lactam and one alpha,omega-amino carboxylic acid. Mention may also be made of the copolyamides resulting from the condensation of at least one alpha,omega-amino carboxylic acid (or one lactam), at least one diamine and at least one dicarboxylic acid.

Examples of lactams which may be mentioned include those having 3 to 12 carbon atoms on the main ring, which lactams may be substituted. Mention may be made, for example, of β,β-dimethylpropiolactam, α,α-dimethylpropiolactam, amylolactam, caprolactam, capryllactam and lauryllactam.

Examples of alpha,omega-amino carboxylic acids that may be mentioned include aminoundecanoic acid and aminododecanoic acid. Examples of dicarboxylic acids that may be mentioned include adipic acid, sebacic acid, isophthalic acid, butanedioic acid, 1,4-cyclohexanedicarboxylic acid, terephthalic acid, the sodium or lithium salt of sulphoisophthalic acid, dimerized fatty acids (these dimerized fatty acids having a dimer content of at least 98% and preferably being hydrogenated) and dodecanedioic acid, HOOC—$(CH_2)_{10}$—COOH.

The diamine can be an aliphatic diamine having 6 to 12 carbon atoms; it may be of aryl and/or saturated cyclic type. Examples that may be mentioned include hexamethylenediamine, piperazine, tetramethylenediamine, octamethylenediamine, decamethylenediamine, dodecamethylenediamine, 1,5-diaminohexane, 2,2,4-tri-methyl-1,6-diaminohexane, diamine polyols, isophoronediamine (IPD), methylpentamethylenediamine (MPDM), bis(aminocyclohexyl)methane (BALM) and bis(3-methyl-4-aminocyclohexyl)methane (BMACM).

Examples of copolyamides that may be mentioned include copolymers of caprolactam and lauryllactam (PA 6/12), copolymers of caprolactam, adipic acid and hexamethylenediamine (PA 6/6-6), copolymers of caprolactam, lauryllactam, adipic acid and hexamethylenediamine (PA 6/12/6-6), copolymers of caprolactam, lauryllactam, 11-aminoundecanoic acid, azelaic acid and hexamethylenediamine (PA 6/6-9/11/12), copolymers of caprolactam, lauryllactam, 11-aminoundecanoic acid, adipic acid and hexamethylenediamine (PA 6/6-6/11/12), and copolymers of lauryllactam, azelaic acid and hexamethylenediamine (PA 6-9/12).

Advantageously the copolyamide is chosen from PA 6/12 and PA 6/6,6.

Polyamide 11 and polyamide 12 are especially preferred.

Polyamides useful as binders in the invention also include polyamide block copolymers, such as polyether-b-polyamide and polyester-b-polyamide.

Another useful polyamide in the invention is Arkema's ORGASOL® ultra-fine polyamide powders, which are microporous, and have open cells due to their manufacturing process. These powders have a very narrow particle size range that can be between 5 and 60 microns, depending on the grade. Lower weight average particle sizes of 5 to 20 are preferred. Due to their microporosity, these polyamide powders can serve both as binders, and also as carriers for active materials, such as catalysts.

Fluoropolymers

The term fluoropolymer denotes any polymer that has in its chain at least one monomer chosen from compounds containing a vinyl group capable of opening in order to be polymerized and that contains, directly attached to this vinyl group, at least one fluorine atom, at least one fluoroalkyl group or at least one fluoroalkoxy group. Examples of fluoromonomers include, but are not limited to vinyl fluoride; vinylidene fluoride (VDF); trifluoroethylene (VF3); chlorotrifluoroethylene (CTFE); 1,2-difluoroethylene; tetrafluoroethylene (TFE); hexafluoropropylene (HFP); perfluoro(alkyl vinyl) ethers, such as perfluoro(methyl vinyl) ether (PMVE), perfluoro(ethyl vinyl) ether (PEVE) and perfluoro(propyl vinyl) ether (PPVE); perfluoro(1,3-dioxole); perfluoro(2,2-dimethyl-1,3-dioxole) (PDD). Preferred fluoropolymers, include homopolymers and copolymers of polyvinylidene fluoride (PVDF), ethylene tetrafluoroethylene (ETFE), terpolymers of ethylene with tetrafluoroethylene and hexafluoropropylene (EFEP), terpolymers of tetrafluoroethylene-hexafluoropropylene-vinyl fluoride (THV), copolymers of vinyl fluoride; and blends of PVDF with polymethyl methacrylate (PMMA) polymers and copolymers, or thermoplastic polyurethanes. PMMA can be present at up to 49 weight percent based on the weight of the PVDF, and preferably from 5 to 25 weight percent. PMMA is melt-miscible with PVDF, and can be used to add hydrophilicity to the binder. A more hydrophilic composition provides for n increased water flow—resulting in less of a pressure drop across the composite article.

The PVDF may be a homopolymer, a copolymer, a terpolymer or a blend of a PVDF homopolymer or copolymer with one or more other polymers that are compatible with the PVDF (co)polymer. PVDF copolymers and terpolymers of the invention are those in which vinylidene fluoride units comprise greater than 40 percent of the total weight of all the monomer units in the polymer, and more preferably, comprise greater than 70 percent of the total weight of the units. Copolymers, terpolymers and higher polymers of vinylidene fluoride may be made by reacting vinylidene fluoride with one or more monomers from the group consisting of vinyl fluoride, trifluoroethene, tetrafluoroethene, one or more of partly or fully fluorinated alpha-olefins such as 3,3,3-trifluoro-1-propene, 1,2,3,3,3-pentafluoropropene, 3,3,3,4,4-pentafluoro-1-butene, and hexafluoropropene, the partly fluorinated olefin hexafluoroisobutylene, perfluorinated vinyl ethers, such as perfluoromethyl vinyl ether, perfluoroethyl vinyl ether, perfluoro-n-propyl vinyl ether, and perfluoro-2-propoxypropyl vinyl ether, fluorinated dioxoles, such as perfluoro(1,3-dioxole) and perfluoro(2,2-dimethyl-1,3-dioxole), allylic, partly fluorinated allylic, or fluorinated allylic monomers, such as 2-hydroxyethyl allyl ether or 3-allyloxypropanediol, and ethene or propene.

In one embodiment, up to 30%, preferably up to 25%, and more preferably up to 15% by weight of hexafluoropropene (HFP) units and 70%, preferably 75%, more preferably 85% by weight or more of VDF units are present in the vinylidene fluoride polymer.

The invention will generally be described below using PVDF as a representative polymer binder.

The PVDF for use in the invention has a high molecular weight. By high molecular weight, as used herein is meant PVDF having a melt viscosity of greater than 1.0 kilopoise, preferably greater than 5 Kp, more preferably from 15 to 50 Kp, and most preferably from 15 to 25 Kp, according to ASTM method D-3835 measured at 450° F. and 100 sec$^{-1}$. The high molecular weight PVDF or polyimide provides for interconnectivity, as it has a higher viscosity and lower flow, so it does not entirely coat the interactive particles.

The PVDF used in the invention is generally prepared by means known in the art, using aqueous free-radical emulsion polymerization—although suspension, solution and supercritical $CO_2$ polymerization processes may also be used. In a general emulsion polymerization process, a reactor is charged with deionized water, water-soluble surfactant capable of emulsifying the reactant mass during polymerization and optional paraffin wax antifoulant. The mixture is stirred and deoxygenated. A predetermined amount of chain transfer agent, CTA, is then introduced into the reactor, the reactor temperature raised to the desired level and vinylidene fluoride (and possibly one or more comonomers) are fed into the reactor. Once the initial charge of vinylidene fluoride is introduced and the pressure in the reactor has reached the desired level, an initiator emulsion or solution is introduced to start the polymerization reaction. The temperature of the reaction can vary depending on the characteristics of the initiator used and one of skill in the art will know how to do so. Typically the temperature will be from about 30° to 150° C., preferably from about 60° to 120° C. Once the desired amount of polymer has been reached in the reactor, the monomer feed will be stopped, but initiator feed is optionally continued to consume residual monomer. Residual gases (containing unreacted monomers) are vented and the latex recovered from the reactor.

The surfactant used in the polymerization can be any surfactant known in the art to be useful in PVDF emulsion polymerization, including perfluorinated, partially fluorinated, and non-fluorinated surfactants. Preferably the PVDF emulsion of the invention is fluorosurfactant free, with no flurosurfactants being used in any part of the polymerization. Non-fluorinated surfactants useful in the PVDF polymerization could be both ionic and non-ionic in nature including, but are not limited to, 3-allyloxy-2-hydroxy-1-propane sulfonic acid salt, polyvinylphosphonic acid, polyacrylic acids, polyvinyl sulfonic acid, and salts thereof, polyethylene glycol and/or polypropylene glycol and the block copolymers thereof, alkyl phosphonates and siloxane-based surfactants.

The PVDF polymerization results in a latex generally having a solids level of 10 to 60 percent by weight, preferably 10 to 50 percent, and having a latex weight average particle size of less than 500 nm, preferably less than 400 nm, and more preferably less than 300 nm. The weight average particle size is generally at least 20 am and preferably at least 50 nm. Additional adhesion promoters may also be added to improve the binding characteristics and provide connectivity that is non-reversible. A minor amount of one or more other water-miscible solvents, such as ethylene glycol, may be mixed into the PVDF latex to improve freeze-thaw stability.

The PVDF latex may be used in the invention as a latex binder, or it may be dried to a powder by means known in the art, such as, but not limited to, spray drying, freeze-drying, coagulating, and drum drying. The dried PVDF powder forms aggregates that have an average particle size of from 0.5 to 200 microns, preferably from 1 to 100 microns, more preferably from 2 to 50 microns, and most preferably from 3 to 20 microns. Smaller size particles are preferred, as they result in a decreased distance (higher density) of interactive particles. In an article formed directly from the emulsion, the emulsion particles have a weight average particle size of less than 500 nm, preferably less than 300 nm, and these particles interact and adhere to two or more interactive particles at discrete points on those interactive particles. In an extrusion process, the polymer resin particles soften in the non-crystalline regions to adhere to the particles at discrete points, but do not melt to completely cover the particles.

Especially useful polyvinylidene fluoride resins include, but are not limited to KYNAR resins from Arkema Inc., especially KYNAR 741, with a particle size of 3-8 microns and a melt viscosity of 16.5-22-5 kpoise; KYNAR 741F, with a particle size of 3-6 microns and a melt viscosity of 16.5-22-5 kpoise, KYNAR 761, with a particle size of 3-8 microns and a melt viscosity of 23.0-29.0 kpoise; KYNAR HSV900, with a particle size of 3-8 microns and a melt viscosity of 44.5-54.5 kpoise; and KYNAR MG15, with a particle size of 3-8 microns and a melt viscosity of 35.0-39.0 kpoise. The melt viscosities being measured by ASTM D3835 at 232° C. and 100 s$^{-1}$.

In one embodiment, copolymers of VDF and HFP are used. These copolymers have a lower surface energy. It is noted that PVDF in general has a lower surface than other polymers such as polyolefins. Lower surface energy leads to better wetting of the interactive particle, and a more uniform dispersion. This results in an improvement in the integrity of the separation device over a polymer binder with a higher surface energy, and should result in the need for a lower level of binder. Additionally, PVDF/HFP copolymers have a lower crystallinity and a lower glass transition temperature (Tg), and therefore can be processed at a lower temperature in a melt process.

In one variant of the invention, the PVDF polymer is a functional PVDF, such as maleic anhydride-grafted PVDF from Arkema. The functional PVDF would improve the binding to interactive particles or fibers, which could permit a lower level of PVDF loading in the formulation. This lower loading-excellent binding combination would improve the overall permeability of the porous separation article.

Other Engineering Polymers

In addition to fluropolymers and polyamides, other thermoplastic engineering polymers, such as polyether ketoneketone (PEKK) or polyether etherketone (PEEK), may be used as binder particles in porous separation articles of the invention. Mixtures of one or more types of polymer binders is also anticipated.

The average particle size for the binder polymers is less than 5 microns, preferably less than 3 microns, more preferably less than 1 micron, more preferably less than 500 nm, and even less than 300 nm.

Interactive Particles or Fibers

One or more types of interactive particles or fibers are combined with the fluoropolymer or polyimide binder. The interactive particles or fibers of the invention are those which have a physical, electrical, or chemical interaction when they come into proximity or contact with dissolved or suspended materials in a fluid (liquid or gas) composition. Depending on the type of activity of the interactive particles, the particles may separate the dissolved or suspended materials by chemical reaction, physical entrapment, physical attachment, electrical (charge or ionic) attraction, or similar means. Examples of interactions anticipated by the invention include, but are not limited to: physical entrapment of compounds from the fluid, such as in activated carbon, nano clays, or zeolite particles; ion exchange resins; catalysts; electromagnetic particles; acid or basic particles for neutralization; etc.

Examples of interactive particles of fibers include, but are not limited to: metallic particles of 410, 304, and 316 stainless steel, copper, aluminum and nickel powders, ferromagnetic materials, activated alumina, activated carbon, carbon nanotubes, silica gel, acrylic powders and fibers, cellulose fibers, glass beads, various abrasives, common minerals such as silica, wood chips, ion-exchange resins, ceramics, zeolites, diatomaceous earth, polyester particles and fibers, and particles of engineering resins such as polycarbonate.

The interactive particles of the invention are generally in the size range of 0.1 to 3,000 micrometers in diameter and fibers of 0.1 to 250 micrometers in diameter of essentially unlimited length to width ratio. Fibers are preferably chopped to no more than 5 mm in length, though long fibers can be used with the binder to produce fiber-reinforced structures for improved mechanical strength. Fiber reinforcement provides improved strength to the porous separation article. Fibers or powders should have sufficient thermal conductivity to allow heating of the powder mixtures. In addition, in an extrusion process, the particles and fibers must have melting points sufficiently above the melting point of the fluorpolymer binder resin to prevent both substances from melting and producing a continuous melted phase rather than the usually desired multi phase system.

The ratio of fluoropolymer or polyamide binder to interactive particles or fibers is from 0.5-35 weight percent of fluoropolymer solids to 65 to 99.5 weight percent interactive particles or fibers, preferably from 0.5-15 weight percent of fluoropolymer solids to 85 to 99.5 weight percent interactive particles or fibers, more preferably from 1-10 weight percent of fluoropolymer solids to 90 to 99 weight percent interactive particles or fibers, and in one embodiment from 0.5-8, weight percent of fluoropolymer solids to 92 to 99.5 weight percent interactive particles or fibers. If less fluoropolymer is used, complete interconnectivity may not be achieved, and if more fluoropolymer is used, there is a reduction in contact between the interactive particles and the fluid passing through the separation article.

The separation articles of the invention differ from membranes. A membrane works by rejection filtration—having a specified pore size, and preventing the passage of particles larger than the pore size through the membrane. The separation articles of the invention instead rely on adsorption or absorption of by interactive particles to remove materials from a fluid passing through the separation device.

The separation articles of the invention, having interconnectivity of interactive particles, can be formed by means known in the art for forming solid articles. Useful processes for forming the separation articles of the invention include, but are not limited to: an extrusion process, as taught in U.S. Pat. No. 5,019,311, compression molding, a co-spray dried powder, and an (aqueous) dispersion binding process.

Extrusion Process

An extrusion process for the formation of a block article can be found in patents by E. Koslow, such as U.S. Pat. No. 5,331,037, incorporated herein by reference. The process involves combining at least one fluoropolymer "binder" particle, consisting of microfine particulate material, mixed with one or more types of interactive particles or fibers. The interactive particles and fibers can consist of nearly any granular, powders, or microfine material or a range of fine or coarse fibers. The particles and fibers should have melting or softening points significantly higher than those of the fluoropolymer binder particles. To this mixture can be added a variety of additives and processing aids. "Additives" are defined as materials that produce desirable changes in the properties of the final product, such as plasticizers that produce a more elastic or rubbery consistency, or stiffeners that produce a strong, brittle, and more ceramic-like final product. "Processing aids" are defined as materials that allow the mixture to be processed with greater ease, such as lubricants for injection molding. The binder should constitute about 3 to about 30% by weight of the overall mixture and, preferably, about 4 to about 8%.

The mixing process typically used to mix binder and interactive materials (particles and/or fibers) is designed to produce as uniform a final product as possible. The quality of the mixture produced by the mixing equipment is important in the process. The cold mixing process usually requires substantial levels of shear to produce a stable, intimate mixture that will be converted to a strong composite during final processing. For example, ball milling must often be carried out in a modified ball mill equipped with articles to increase shear. Plow mixers must also be modified with articles that "smear" the materials. Generally powder mixtures (those not containing significant quantities of long fibers) can be effectively mixed using a modified ball mill or plow mixer, while mixtures of fibers and particles can be effectively dispersed in a high-intensity mincing mixer.

In addition, it is suspected that the process requires a special distribution of particles within the mixture. Binder particles must be dispersed individually or as small clusters between and upon the surrounding interactive particles. The binder particles must stick to the interactive particles in an effect that produces a low-dusting, slow moving matrix. To supplement this stickiness, binder or interactive particles sometimes need to be coated with a trace of surfactant or similar material.

The resulting mixture, once all particles and components have been substantially uniformly dispersed, is then processed in accordance with the invention by a procedure which may include any of a number of conventional processes often applied to plastics. These include extruding to produce objects with two dimensional uniform shapes, hot roll compacting to produce thin sheets or thick slabs of material, or compression or injection molding to produce complex bulk shapes.

To accomplish the formation of the unique continuous web of the binder resin and the immobilization or forced point-bonding of the interactive particles or fibers, the plastics molding, extruding, roll compacting, or other forming equipment is operated in such a manner as to obtain a critical combination of applied pressure, temperature, and shear in a required time sequence. The conditions required to convert the binder particles from their original, normally powder or spherical particulate form, into a thin, continuous web matrix within the final structure varies according to the type of resin used. However, the basic requirements include the following steps.

1. In the absence of any significant pressure or shear, the mixture is first brought to a temperature sufficiently above (preferably at least about 20° C., most preferably about 40° C. above) the softening point of the binder resin but normally below the softening point of the interactive particles and fibers within the mixture.
2. After being heated to at least the temperature of step 1, the mixture is placed under sufficient applied pressure, generally at least about 50 psi (3.5 kg/cm$^2$), preferably at least about 1000 psi (70.31 kg/cm$^2$) and most preferably at least about 6,000 psi (421.86 kg/cm$^2$) to substantially immediately consolidate the loose material and work the binder resin by the surrounding interactive particles to convert at least a portion of said binder material particles into a continuous web between the interactive particles. The applied pressure must be sufficient to "activate" the binder and is applied only upon reaching the necessary temperature as mentioned in step 1.

3. The mixture must undergo at least some minimal (finite) shear during the application of pressure, even if the shear is simply the movement of the particles required to consolidate the mass from its originally loose form into a more compact form. It is believed that this serves to "smear" the particles of binder into thin films which coalesce with one another to form a continuous web matrix. During extrusion, although the particles would be preconsolidated during heating in the die, the material experiences a combination of shear and pressure in the final forming portion of the die where temperature, pressure drop, and shear are sufficient to accomplish conversion of the binder.

4. The application of heat and pressure must be of sufficiently short duration that the continuous web formed during the process does not revert to a non-continuous condition as a result of melting and reconsolidation into individual droplets or particles.

5. The process is conducted at great speed and then the resulting immobilized material is relatively quickly cooled to a temperature below the melting point of the binder to "freeze" the unstable structure once it is formed.

In another embodiment of this invention, the applied pressure in step 2 is in the lower range such that the formation of a continuous web decreases or ceases and the composite structure is formed by forced point-bonding between the interactive particles. The application of heat and pressure in this process is also of short duration and the cooling is relatively quick so that the forced point-bonds formed during the process are retained.

Pulling, cutting, or applying a stress to the structure converts the fine web of polymer into very fine fibers. The resulting fibers can sometimes be very fine and fibrillated into even submicron sizes.

The speed of the process appears to be limited primarily by the speed with which heat can be moved into the mixture of particles. The formation of the continuous polymeric web or forced point-bonds appears to require only a momentary application of high pressure and shear. If the product is held tier an extended period at the elevated temperature, there is a rapid deterioration of the product and loss of the continuous web or binding points. Therefore, following the formation of continuous binder resin structure in the material should be cooled rapidly, preferably as rapidly as possible. Prior to the complete cooling of the product, the structure remains soft and can be deformed easily. The product is therefore usually allowed to partially cool somewhat prior to removal from the mold or emergence from the extrusion tool. In this warm condition, the product may be manipulated to produce a fine surface finish or a smoothed sheet. Water sprays or air blasts may be used to hasten cooling. Flat sheets produced on a hot roll compactor are allowed to cool during their travel several feet from the roll prior to being manipulated. In some cases, sheets of the material are further processed for flatness while still warm and pliable.

The product of the process can be a rubbery or plastic material whose properties can be varied widely through the use of higher or lower pressure and shear, higher or lower temperature, and through the use of various additives that, in small amounts, substantially change the properties of the product.

It has been observed that increasing the pressure and applied shear upon the mixture will result in a substantial increase in the degree of continuity of the binder resin within the product structure. The thickness of the web produced by an applied stress appears to decline as temperature is increased from a minimum temperature to a maximum temperature. Above a certain temperature, the resulting matrix formation is observed to decline. It is suspected that, above a critical temperature, the continuous structure formed by the process cannot cool quickly enough below a "melt flow" temperature and the continuous web is lost due to subsequent flow back into globular form.

The process is therefore usually carried out within a preferred operational temperature range. This range may vary with the size and shape of the object being produced. For example, thin sheets that can be heated and cooled very quickly can be formed at lower temperatures than larger slabs or bulk shapes. The allowed temperature range therefore becomes more limited as the size of the object being formed increases. In practice, objects up to 2 inches (5.1 cm) in thickness can be formed within a practical temperature range. However, the ability to carry out the process declines with increasing thickness of the product as the required temperature rises and the ability to cool quickly is lost.

It has been found that a minimum applied pressure and significant shear are required to "activate" the process. Below a critical pressure, no continuous binder structure is observed to occur. Forced point-bonding of the particles can, however, still occur.

Ceramic-like materials can be produced using the process by employing small interactive particles having complex convoluted shapes that can effectively interlock (diatomaceous earth is a good example), and by operating the process at high temperatures and high pressure. The resulting material is extremely rigid and brittle. Such structures are particularly desirable in certain processes where a product that retains its shape is required, as in the case of extruded structures or molded objects.

The process can be used to produce mixtures of particles that are normally not compatible. For example, a mixture of ion exchange resin and a magnetic stainless steel powder can be combined to form a magnetic ion-exchange resin composite particle. This is made possible by the discovery that binder resin particles and treatment with trace quantities of alkyl ethoxalate type surfactants can yield stable mixtures of particles of very different densities that can be processed into a uniform product. Alternatively, sorbent particles can be formed into sheets, slabs, or bulk shapes, or can be molded directly into retaining structures (such as cartridges or pressure vessels). If molded into a container, the particle are both captured within the structure that is spontaneously formed during the molding process, and also bonded to the walls of the container to produce a high-integrity structure that can not settle, shift, channel, or undergo attrition.

Compression Molding Process

Polymer powder (PVDF, polyimide, or polyolefin) is weighed out in a suitable ratio to active carbon powder and mixed using a high speed mixer, such as a Henschel mixer or a Waring bench top blender mill. Mixing speed can range from 800-1500 rpm. Mix time ranges from 1-3 minutes depending upon the amount of powder being blended.

The blended powder is loaded into a compression molding frame (6"×6"×⅛") so that the powder completely and evenly fills the mold frame to the top surface. The frame should be pre-set on larger area steel plate with piece of Kapton film covering the plate area underneath the mold frame. A slight excess of powder on the top surface helps the compression process. The top of the mold frame is covered with another piece of KAPTON polyimide film, and then a solid steel plate placed on top.

The loaded mold assembly is then placed on the heated (450° F.) platens of a Carver press, and compressed until the upper and lower platens contact the mold assembly to a pressure of 1000-3000 psi. This is the pre-heat step, and the mold is allowed to heat for 3-5 minutes under these conditions. The compaction pressure is the increased to 10,000 psi and the mold held at temperature for an additional 3-5 minutes. The pressure is then released and the hot mold immediately transferred to a cold press where it is re-compressed to 10,000 psi for 3 minutes to cool. The mold is then released from the press and taken apart to isolate the solidified molded plaque.

When this procedure was applied to both 10% and 20% PVDF—carbon blends, porous, sintered solid plaques were obtained. However, when 10% and 20% polyethylene-carbon blends were tested, the powder blend failed to sinter together, leaving only free-flowing powder. These results show how PVDF resin binds active carbon better than polyethylene powder. This result can benefit manufacturing of polymer-carbon block filters by reducing processing conditions (temperature, pressure, time) that add cost to the process.

A cold press process was tried to improve the sintering of the PE-carbon powder mix. In this process, 6-7 g of the carbon-polymer powder mix was placed in a Carver cylinder mold (1⅛" dia×3" 1) and this filled cylinder mold placed in a cold press and compressed to 10,000 psi for 3 minutes. The mold is then disassembled and a compacted polymer tablet is recovered.

The PVDF-carbon powder produced porous solid compacted disks by this method. However, the PE-carbon powder failed to compact into a solid mass by this process; only a free flowing powder was left behind. These results further reinforce the superiority of PVDF resin as mechanical binder for active carbon when compared to polyolefin powder.

Co-Spray Dried Powder

The powder to be used in a thermal process, such as the extrusion process and compression molding processes described above, can be pre-blended with the interactive particles. In one embodiment, an intimate blend of the fluoropolymer and interactive particles can be prepared by co-spray drying the components. One could mix together an effective amount of PVDF latex with the powdery carbon or other interactive particles and co-spray them to achieve a dry powder that is well mixed at nano-scale. This co-spray dried complex can then be molded to any desired shape porosity. A small particle size latex (generally 20-400 nm) provides an extremely intimate blend with the interactive particles, and can reduce the level of hinder required, while making the highest amount of interactive particle surface available for separation. The co-spray dried complex involves these very small emulsion particles, physically associated with the interactive particles through the spray drying of the blend.

Dispersion Coating Process

One advantage of an aqueous coating process over the extrusion process, is that very little pressure is involved during manufacture that might break fragile interactive particles. Further, the polymer chosen can be a thermoset as well as a thermoplastic, and since the polymer is used in a dispersion, as polymerized, the molecular weight can be very high, and still be processable. The particle size of a latex particle is very much smaller than a powdered binder particle, and therefore many more and smaller adhesive connections are provided with the interactive particles by the latex particles, as with the polymer powder particles, on a weight basis.

In one embodiment, a PVDF dipersion is formed (preferably without any fluorosurfactant) and a predetermined amount of any anti-settling agent(s) or surfactant(s), is diluted in water and post-added to the PVDF dispersion latex with stirring, in order to provide adequate storage stability for the latex. To this PVDF dispersion/anti-settling mixture is added, with stirring, optional wetting agent(s), followed by adding any thickener(s), and fugitive adhesion promoter(s), and then bringing the pH up to the appropriate range for the thickener to be effective, if necessary. Some thickeners such as CMC are effective in a wide range of pH, i.e. from 3 to 9 pH for CMC. The interactive particles and any other ingredients are then added to the mixture. It may be advantageous to disperse the interactive particles or fibers in the fugitive adhesion promoter, the latent solvent or wetting agent to provide wetting of the interactive particles prior to admixing with the aqueous PVDF binder formulation. The final composition is then subjected to a high shear mixing to ensure uniform distribution of the powdery material in the composition. The final aqueous composition of the invention should have a viscosity useful for casting or coating onto a substrate. The useful viscosity is in the range of from 2,000 to 20,000 cps at 20 rpm, and 25° C. depending on application methods.

The composition of the invention contains 0 to 10 parts, preferably from 0.1 to 10 parts, and more preferably 0.5 to 5 parts of one or more anti-settling agents and/or surfactants per 100 parts of water. In one embodiment the level of anti-settling agent or surfactant is from 2.7 to 10 parts per 100 parts of water. These anti-settling agents or surfactants are added to the PVDF dispersion post-polymerization, generally to improve the shelf stability, and provide additional stabilization during slurry preparation. Also during the polymerization process, the surfactant/anti-settling agent used in this invention could be added all upfront prior to polymerization, fed continuously during the polymerization, fed partly before and then during polymerization, or fed after polymerization started and progressed for a while.

Useful anti-settling agents include, but are not limited to, ionic substances, such as salts of alkyl sulfates, sulfonates, phosphates, phophonates (such as sodium lauryl sulfate and ammonium lauryl sulfate) and salts of partially fluorinated alkyl sulfates, carboxylates, phosphates, phosphonates (such as those sold under the CAPSTONE brandname by DuPont), and non-ionic surfactants such as the TRITON X series (from Dow) and PLURONIC series (from BASF). In one embodiment, only anionic surfactants are used. It is preferred that no fluorinated surfactants are present in the composition, either residual surfactant from the polymerization process, or added post-polymerization in forming or concentrating an aqueous dispersion.

The composition of the invention optionally contains 0 to 5 parts, preferably from 0 to 3 parts of one or more wetting agents per 100 parts of water. Surfactants can serve as wetting agents, but wetting agents may also include non-surfactants. In some embodiments, the wetting agent can be an organic solvent. It has been found that the presence of optional wetting agents permits uniform dispersion of powdery electrode material(s) into aqueous dispersion of vinylidene fluoride polymer. Some electrode materials, such as carbonaceous materials will not disperse in an aqueous dispersion without the use of wetting agent. Useful wetting agents include, but are not limited to, ionic and non-ionic surfactants such as the TRITON series (from Dow) and the PLURONIC series (from BASF), and organic liquids that are compatible with the aqueous dispersion, including but not limited to NMP, DMSO, and acetone.

The composition of the invention may contain 0 to 10 parts, preferably from 0 to 5 parts of one or more thickeners or rheology modifiers per 100 parts of water. Addition of water-soluble thickener or rheology modifier to the above dispersion prevents or slows down the settling of interactive particle of fiber materials while providing appropriate slurry viscosity for a casting process. Useful thickeners include, but are not limited to the ACRYSOL series (from Dow Chemical); partially neutralized poly (acrylic acid) or poly (methacrylic acid) such as CARBOPOL from Lubrizol; and carboxylated alkyl cellulose, such as carboxylated methyl cellulose (CMC). Adjustment of the formulation pH can improve the effectiveness of some of the thickeners. In addition to organic rheology modifiers, inorganic rheology modifiers can also be used alone or in combination. Useful inorganic rheology modifiers include, but are not limited to, inorganic rheology modifiers including but not limited to natural clays such as montmorillonite and bentonite, manmade clays such as laponite, and others such as silica, and talc.

The thickeners of the invention are used in the aqueous composition containing the PVDF and powdery electrode material, and are not used in pure form as a second coating composition as has been described in the JP 2000357505 reference.

A fugitive adhesion promoter is required to produce the interconnectivity needed from the composition of the invention. By "fugitive adhesion promoter" as used herein is meant an agent that increases the interconnectivity of the composition after coating on a substrate. The fugitive adhesion promoter is then capable of being removed from the formed electrode generally by evaporation (for a chemical) or by dissipation (for added energy).

The fugitive adhesion promoter can be a chemical material, an energy source combined with pressure, or a combination, used at an effective amount to cause interconnectivity of the components of the aqueous composition during formation of the electrode. For chemical fugitive adhesion promoters, the composition contains 0 to 150 parts, preferably 1 to 100 parts, and more preferably from 2 to 30 parts, of one or more fugitive adhesion promoters per 100 parts of water. Preferably this is an organic liquid, that is soluble or miscible in water. This organic liquid acts as a plasticizer for PVDF particles, making them tacky and capable of acting as discrete adhesion points during the drying step. The PVDF polymer particles are able to soften, flow and adhere to powdery materials during manufacture, resulting in high connectivity that is non-reversible. In one embodiment the organic liquid is a latent solvent, which is a solvent that does not dissolve or substantially swell PVDF resin at room temperature, but will solvate the PVDF resin at elevated temperatures. In one embodiment a useful organic solvent is N-methyl-2-pyrrolidone. Other useful fugitive adhesion promoter agents include, but are not limited to, dimethylformamide, N,N-dimethylacetamide, dimethylsulfoxide (DMSO), hexamethylphosphamide, dioxane, tetrahydrofuran, tetramethylurea, triethyl phosphate, trimethyl phosphate, dimethyl succinate, diethyl succinate and tetraethyl urea.

In the case of energy as the fugitive adhesion promoter, useful energy sources include, but are not limited to, heat, IR radiation, and radio frequency (RF). For heat alone, the temperature during the processing of the PVDF composition on an electrode should be about 20 to 50° C. above the melting point of the polymer. When energy alone is used as the fugitive adhesion promoter, it is preferred that the heat is combined with pressure—such as a calendering step, for good interconnectivity.

The composition of the invention may further contain effective amounts of other additives, including but not limited to fillers, leveling agents, anti-foaming agents, pH buffers, and other adjuvants typically used in waterborne formulation.

The aqueous composition is molded into a finished article, or is coated onto a porous formed thin substrate by means known in the art, such as by brush, roller, ink jet, squeegee, foam applicator, curtain coating, vacuum coating, or spraying. The molded article or coated substrate is then dried to fount a coherent composite that can be optionally baked at elevated temperature to achieve high adhesion strength.

The aqueous PVDF dispersion serves as a binder with polymer particles binding together the interactive particles or fibers only at specific discrete points to produce interconnectivity.

In one embodiment of the invention, a separation article may be a hybrid filtration article composed of both a secondary filter to remove large particles prior to the fluid passing through the fluoropolymer solid separation article. This secondary filtration component could be a larger-mesh filter, spun fibers, loose fiber fill, screens, or other known secondary filtration means. By microporous or solid film membrane pretreatment. The secondary filtration could be any material, though fluoropolymer materials could be especially useful due to their chemical and biological inertness, and high mechanical and thermo mechanical properties.

In one embodiment a carbon block filter normally 2.5 inches in diameter could be reduced to 1.5 inches in diameter and replaced within a secondary filtration media to build the outside diameter back up to the 2.5 inches.

Uses

Due to the advantageous properties of fluoropolymer and polyamide materials, including chemical inertness, biological purity, and excellent mechanical and thermo mechanical properties, compared to other binder materials, such as the typically used polyethylene, the separation articles of the invention can be used in a variety of different and demanding environments. High temperatures, highly reactive, caustic or acidic environments, sterile environments, contact with biological agents, are environments where the separation articles of the invention have distinct advantages over other polymer binder systems. The separation articles can be used to purify and remove unwanted materials from the fluid passing through the separation article, resulting in a more pure fluid to be used in various commercial or consumer applications. The separation article can also be used to capture and concentrate materials from a fluid stream, these captured materials then removed from the separation article for further use. One example could be heavy metal recovery. The separations devices can be used for potable water purification (hot and cold water), and also for industrial uses. By industrial uses is meant uses at high temperatures (greater than 50° C., greater than 75° C., greater than 100° C. greater than 125° C. and even greater than 150° C., up to the softening point of the polymer binder; uses with organic solvents, and in pharmaceutical and biological clean and pure uses. Catalysts, such as palladium can be supported within the block article.

Some articles of the invention include, but are not limited to:

Oil filters, in which the composite latex can be coated onto the paper filter medium.

Carbon block filtration systems.

Ion exchange membranes or columns.

Catalysis media for promoting chemical reactions.

Bioseparation and recovery of pharmaceutical and biological active ingredients.

Gas separation, both from other gases, of gases dissolved in aqueous and non-aqueous media, and particulates suspended in gas. For example, mercury vapor can be removed, as well as halogen gas scrubbing.

Chemical scrubbers, particularly for flue gasses in a very acidic environment.

Chemical resistant protective clothing and coverings.

Hot water process (>80° C.) filtration for antiscale build-up and removal of organic contaminants, and reduction of calcium and magnesium ion.

Automotive exhaust filtration.

Closed loop industrial water systems.

Industrial water treatment.

Exhaust, vent and chimney capture of greenhouse gases.

Treatment of contaminated groundwater.

Treatment of brine and saline water to potable water.

Use as a particulate filter.

Treatment in ozone exposure

The purification and/or filtration of:

aliphatic solvents, strong acids, hot (>80° C.) chemical compounds, hydrocarbons, hydrofluoric acid, diesel and biodiesel fuels, ketones, amines, strong bases, "fuming" acids, strong oxidants, aromatics, ethers, ketones, glycols, halogens, esters, aldehydes, and amines, compounds of benzene, toluene, butyl ether, acetone, ethylene glycol, ethylene dichloride, ethyl acetate, formaldehyde, butyl amines, etc.

The removal of inorganic and ionic species from aqueous, non-aqueous, and gaseous suspensions or solutions, including but not limited to cations of hydrogen, aluminum, calcium, lithium, sodium, and potassium; anions of nitrate, cyanide and chlorine; metals, including but not limited to chromium, zinc, lead, mercury, copper, silver, gold, platinum, iron and other precious or heavy metal and metal ions; salts, including but not limited to sodium chloride, potassium chloride, sodium sulfate; and removal of organic compounds from aqueous solutions and suspensions.

Based on the list of exemplary uses, and the descriptions in this description, one of ordinary skill in the art can imagine a large variety of other uses for the composite solid article of the invention.

EXAMPLES

Example 1

Using the compression molding process described above, a 50:50 mixture of PVDF resin (avg Mw~580 000, MFI 2.5 g/10 min @ 12.5 kg, weight average particle size 3-8 micron) and active carbon (ACTICABONE 2SW) was compacted. A solid porous sheet was produced. This sheet had good mechanical integrity and did not easily break apart with manual handling.

A 25 mm dia disk was cut out of the sheet for testing by capillary flow porometry. This same sample was also used to test water permeability under pressure. The data are presented in Table 1.

Example 2

Using the compression molding process described above, a 50:50 mixture of PVDF resin (avg Mw~300 000, MFI 12.0 g/10 min @ 12.5 kg, weight average particle size 3-8 micron) and active carbon (ACTICABONE 2SW) was compacted. A solid porous sheet was produced. This sheet had acceptable mechanical integrity and abraded slightly during handling.

A 25 mm dia disk was cut out of the sheet for testing by capillary flow porometry. This same sample was also used to test water permeability under pressure. The data are presented in Table 1.

Example 3

Using the compression molding process described above, a 50:50 mixture of PVDF-HFP copolymer resin (avg Mw~500 000, MFI 6.0 g/10 min @ 21.6 kg) and active carbon (ACTICABONE 2SW) was compacted. A solid porous sheet was produced. This sheet had very good mechanical integrity and did not easily break apart with manual handling.

A 25 mm dia disk was cut out of the sheet for testing by capillary flow porometry. This same sample was also used to test water permeability under pressure. The data are presented in Table 1.

Example 4

Using the compression molding process described above, a 20:80 mixture of PVDF resin (avg Mw~300 000, MFI 12.0 g/10 min a 12.5 kg, weight average particle size 3-8 micron) and active carbon (ACTICABONE 2SW) was compacted. A solid porous sheet was produced. This sheet was rather fragile but could be handled without breaking.

Example 5

Using the compression molding process described above, a 10:90 mixture of PVDF resin (avg Mw~300 000, MFI 12.0 g/10 min @ 12.5 kg, weight average particle size 3-8 micron) and active carbon (ACTICABONE 2SW) was compacted. A solid porous sheet was produced. This sheet was quite fragile and had to be handled very carefully to prevent fracturing. This material abraded easily.

Comparative Example 1

Using the compression molding process described above, a 50:50 mixture of polyethylene resin (Marlex HMN TR-938, MFI 3.0 g/10 min @ 2.16 kg), and active carbon (ACTICABONE 2SW) was compacted. A rough solid porous sheet was produced. This sheet was very irregular in morphology, with some sections very dense and compact and others very weak and powdery. The sheet was very fragile and could break up easily.

A 25 mm dia disk was cut out of the sheet for testing by capillary flow porometry. This same sample was also used to test water permeability under pressure. The data are presented in Table 1. The porometry data confirm the irregularity of the compacted structure as evidenced by the large difference between the bubble point diameter and mean pore diameters. The porous sheets made with PVDF resin were much more uniform in pore structure, evidenced by the proximity of the bubble point and mean pore diameters.

Furthermore, the irregular structure (with dense, compacted regions) of the polyethylene-carbon blend was evidenced by the low water permeability compared to the blends with PVDF resin.

Comparative Example 2

Using the compression molding process described above, a 20:80 mixture of polyethylene resin (Marlex HMN TR-938, MFI 3.0 g/10 min @ 2.16 kg) and active carbon (ACTICABONE 2SW) was compacted. This blend failed to form a solid sheet, and remained in powder form.

Comparative Example 3

Using the hot press method described above, a 10:90 mixture of polyethylene resin (Marlex HMN TR-938, MFI 3.0 g/10 min @ 2.16 kg) and active carbon (ACTICABONE 2SW) was compacted. This blend failed to form a solid sheet, and remained in powder form.

TABLE 1

Porometry and Water Permeability Data

| Example | Bubble Point Dia (um) | Mean Pore Dia (um) | Water Permeability (l/m² @ 8 psi) |
|---|---|---|---|
| 1 | 6.237 | 2.256 | 125 |
| 2 | 8.517 | 3.416 | 550 |
| 3 | 6.491 | 3.988 | 260 |
| Comparative 1 | 5.488 | 0.597 | 10.5 |

Porometry data were measured on a automated capillary flow porometer (PMI) using ASTM F316 and water permeability tests were run with procedures similar to ASTM D4491.

Example 6

KYNAR PVDF carbon block and polyethylene carbon block filters would be produced using identical grades and lot #s of activated carbon particles. Both carbon blocks would then be assembled to filter a water fluid containing 25% bromine concentration. It would be expected visually that the KYNAR carbon block filter would retain properties suitable for adequate filtration at 40° C. temperature. The polyethylene carbon block filter would not be expected to provide adequate properties to filter such a solution which would subsequently result in a total loss of properties attributable to the effects that the bromine has directly on the polyethylene binder.

Example 7

To test the compatibility of binder materials to different fuels physical properties and permeation effects were monitored between KYNAR PVDF and polyethylene. At 60° C. for 6 months, both binding materials were measured for weight change and length change. Both of these variables are critical when designing a carbon block which needs to keep tight tolerances for absolute filtration as well as for module design specifications. Having a maximum of 4% change in properties has been determined as the cut off point. For KYNAR 740 at 60° C. full immersion in 50 vol % iso-octane and 50 vol % toluene blend it exhibited a 2.3% weight change and a 1.8% length change. For KYNAR 740 at 60° C. full immersion in 42.5 vol % iso-octane, 42.5 vol % toluene, and 15 vol % blend it exhibited 3.0% change in weight and a 3.6% change in length. For polyethylene at 60° C. full immersion in 50 vol % iso-octane and 50 vol % toluene blend it exhibited a 10.8% weight change and a 5.3% length change. For polyethylene at 60° C. full immersion in 42.5 vol % iso-octane, 42.5 vol % toluene, and 15 vol % blend it exhibited 9.6% change in weight and a 5.3% change in length. KYNAR 740 PVDF performed excellent in this testing, where as the chemical resistance of polyethylene has been found to be unsuitable for this application.

Example 8

A 20:80 mixture of PA11 resin and active carbon (ACTICABONE 2SW) would be compacted using the compression molding process described in Example 1. A solid porous sheet would be expected. It is expected this sheet would have good mechanical integrity and not easily break apart with manual handling.

The invention claimed is:

1. A composite porous solid article tier the separation of components of a fluid comprising:
 a) 0.5 to 35 weight percent of a high molecular weight binder selected from the group consisting of polyamide 11, polyamide 12, polyether-b-polyamide, polyester-b-polyamide, microporous ultra-fine polyamide powder, polyether ketoneketone (PEKK) and polyether etherketone (PEEK), having a melt viscosity of greater than 1 kpoise as measured by ASTM D3835 at 232° C. and 100 s$^{-1}$, and
 b) 65 to 99.5 weight percent of interactive particles having an average particle diameter of from 0.1 to 3,000 microns, the weight percent based on the total of said polyamide, PEEK or PEKK binder and interactive particles,
wherein said interactive particles exhibit interconnectivity.

2. The composite solid article of claim 1, wherein the interactive particles are selected from the group consisting of metallic particles of 410, 304, and 316 stainless steel, copper, aluminum and nickel powders, ferromagnetic materials, activated alumina, activated carbon, carbon nanotubes, silica gel, acrylic powders and fibers, cellulose fibers, glass beads, various abrasives, common minerals such as silica, wood chips, ion-exchange resins, ceramics, zeolites, diatomaceous earth, polyester particles and fibers, and particles of engineering resins such as polycarbonate.

3. The composite solid article of claim 1, wherein said polyamide, polyether ketoneketone (PEKK) or polyether etherketone (PEEK) binder has a melt viscosity of 15 to 50 kpoise.

4. The composite solid article of claim 1, wherein said polyamide comprises PA6, PA 6,6, PA 6,10, polyamide 11, polyamide 12, a block copolymer of polyether-b-polyamide, or polyester-b-polyamide.

5. The composite solid article of claim 1, wherein the interactive particles comprise activated carbon.

6. The composite solid article of claim 1, wherein said article is a part of a carbon block system for water filtration, or industrial filtration of fluids.

7. The composite solid article of claim 1, wherein said article is a hybrid article further comprising a secondary filtration system.

8. A process for separating compounds from a liquid or gas stream, comprising passing said liquid or gas stream through a porous separation article, wherein said porous solid article comprises:

a) 0.5 to 35 weight percent of a high molecular weight binder selected from the group consisting of polyamide, polyether ketoneketone (PEKK) and polyether etherketone (PEEK) having a melt viscosity of greater than 1 kpoise as measured by ASTM D3835 at 232° C. and 100 s$^{-1}$, and b) 65 to 99.5 weight percent of interactive particles having an average particle diameter of from 0.1 to 3,000 microns, the weight percent based on the total of said polyamide, PEEK or PEKK binder and interactive particles, wherein said interactive particles exhibit interconnectivity.

9. The process of claim 8, wherein said compounds separated from said liquid or gas stream are selected from the group consisting of particulates; biological and pharmaceutical active ingredients; organic compounds; acids, bases, hydrofluoric acid; cations of hydrogen, aluminum, calcium, lithium, sodium, and potassium; anions of nitrate, cyanide and chlorine; metals, chromium, cadmium, arsenic, zinc, lead, mercury, copper, silver, gold, platinum, iron; salts, sodium chloride, potassium chloride, sodium sulfate and gases.

10. The composite solid article of claim 1, wherein said fluid is a liquid or gas selected from the group consisting of water, brine, oil, diesel fuel, biodiesel fuel, a pharmaceutical or bio-pharmaceutical fluid, aliphatic solvents, strong acids, hot (>80° C.) chemical compounds, hydrocarbons, hydrofluoric acid, ethanol, methanol, ketones, amines, strong bases, "fuming" acids, strong oxidants, aromatics, ethers, ketones, glycols, halogens, esters, aldehydes, and amines, compounds of benzene, compounds of chlorine, compounds of bromine, toluene, butyl ether, acetone, ethylene glycol, ethylene dichloride, ethyl acetate, formaldehyde, butyl amines, exhaust gases, automotive exhaust, and groundwater.

11. The process of claim 8, wherein said liquid or gas stream is selected from the group consisting of cold water of less than or equal to 50° C., hot water of greater than 50° C., organic solvents, and pharmaceutical or biological preparations.

* * * * *